United States Patent
Hull

[11] 3,836,092
[45] Sept. 17, 1974

[54] CLOSED FACE SPINNING REEL

[76] Inventor: R. Dell Hull, 6101 E. Apache St., Tulsa, Okla. 74101

[22] Filed: Mar. 16, 1973

[21] Appl. No.: 341,904

[52] U.S. Cl. ............................................ 242/84.2 A
[51] Int. Cl. ............................................... A01k 89/00
[58] Field of Search ..... 242/84.2 R, 84.2 B, 84.2 A, 242/84.21 A, 84.21 R, 84.1 R; 43/22

[56] References Cited
UNITED STATES PATENTS

| | | | |
|---|---|---|---|
| 2,428,908 | 10/1947 | Cooper et al. | 242/84.1 R X |
| 2,613,468 | 10/1952 | Hand | 242/84.21 A X |
| 2,964,257 | 12/1960 | Hull | 242/84.2 A X |
| 3,025,020 | 3/1962 | Sarah | 242/84.21 A X |
| 3,146,965 | 9/1964 | Khazzam | 242/84.2 A |
| 3,351,300 | 11/1967 | Nagy | 242/84.2 A |
| 3,481,554 | 12/1969 | Hull | 242/84.2 A |
| 3,489,365 | 1/1970 | Hull | 242/84.2 A |

*Primary Examiner*—Billy S. Taylor
*Attorney, Agent, or Firm*—Manderville and Schweitzer

[57] ABSTRACT

The disclosure herein relates to fishing reels, especially so-called closed face spinning reels, and it is directed more specifically to several unique structural arrangements in closed face spinning reels, including an improved drag brake arrangement, utilizing a disc friction surface on the front side of the spool in conjunction with pressure buttons on the rear side of the reel; an improved actuating arrrangement for the drag brake, including a deformable ring carrying friction buttons for the drag brake and a single revolution cam with an associated star wheel for the drag brake adjustment; an improved mounting of the winding shaft and associated bushings in molded U-shaped bearing supports; an improved anchoring of the tang to the reel housing, including a dovetailed engagement of the tang in the housing; and an improved arrangement of "no-back" elements to provide for actuation of a no-back pawl in one plane by an actuating arm attached directly to the winding shaft and operated in another plane. These new structural arrangements for closed face spinning reels enhance and simplify the operation thereof, accommodate the use of inexpensive new plastic materials of construction, simplify the manufacture of the components, and simplify the assembly thereof in the mass production of closed face spinning reels.

10 Claims, 10 Drawing Figures

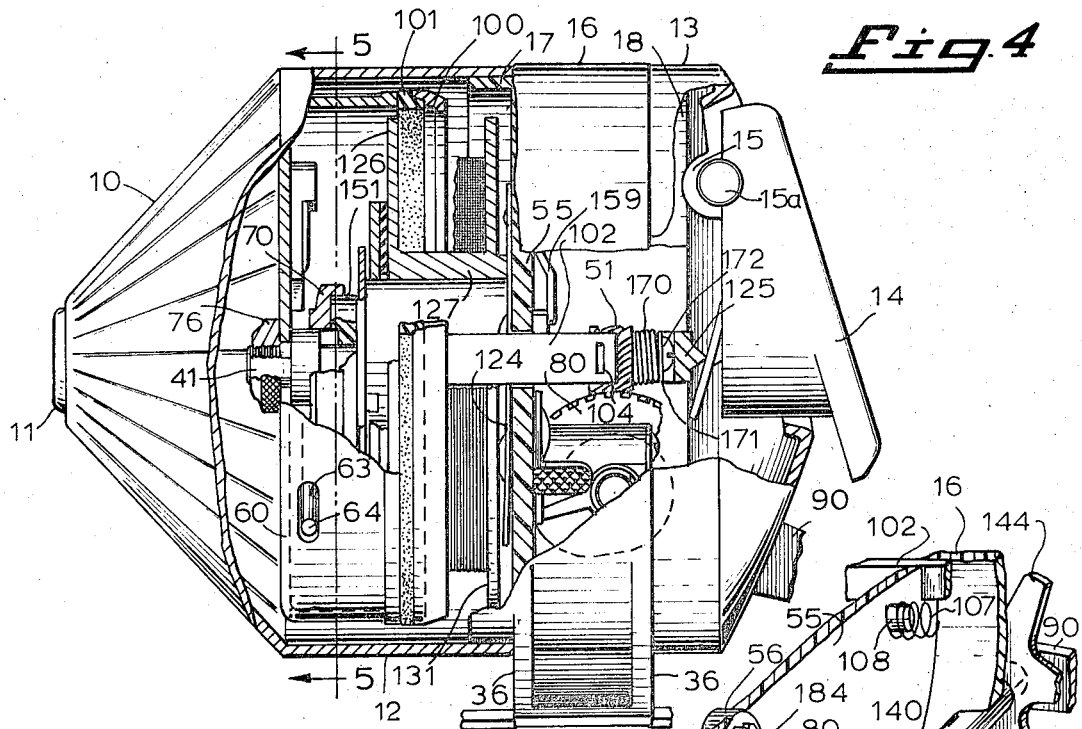
Fig. 4
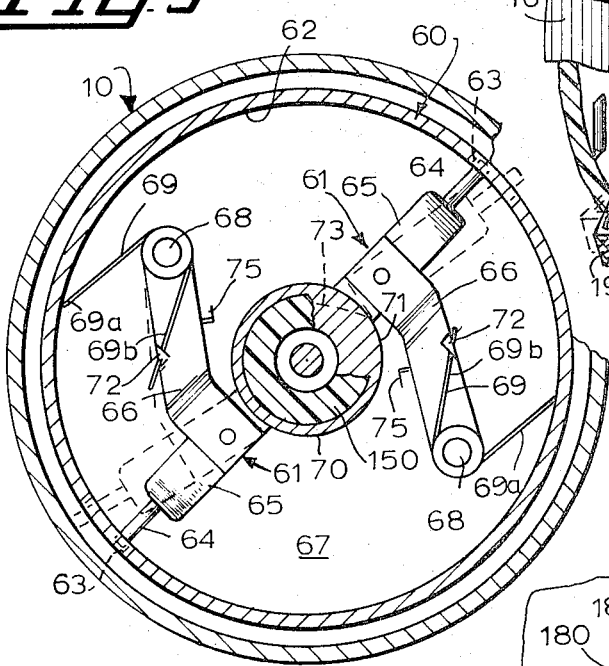
Fig. 5
Fig. 6
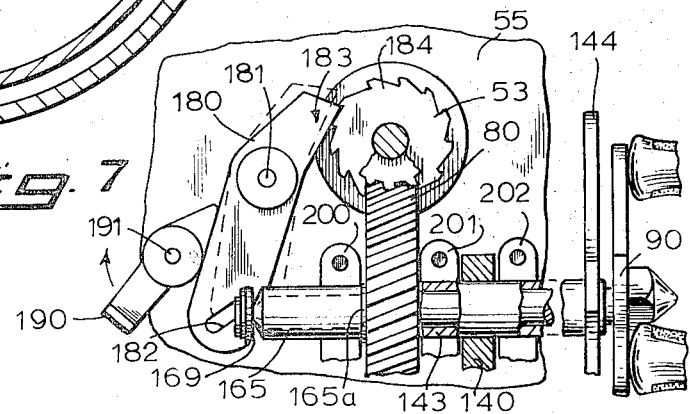
Fig. 7

CLOSED FACE SPINNING REEL

BACKGROUND AND SUMMARY OF THE INVENTION

Closed face fishing reels are well known to the art and have been manufactured in large quantities at comparatively low cost for many years in a variety of embodiments. Representative of the earlier reels and the well developed and rather crowded state of the art are the many U.S. Pats. issued to R. D. Hull, including among many others Nos. 2,541,360; 2,668,025; 2,675,193; 2,964,257; 3,020,666; 3,059,873; 3,088,691; 3,185,405; 3,469,799; 3,481,554; and 3,552,674. anti-reverse Closed face spinning reels of the type contemplated herein typically include a normally non-rotatable line spool from which fishing line is paid out and retrieved by an appropriate pickup element rotated by a crank mechanism geared thereto; a line brake to hold the line during the initial phases of casting; a drag brake mechanism to permit controlled payout of the line by rotation of the line spool when an undue pressure is exerted thereon by a hooked fish; an akti-reverse mechanism to prevent the rotation of the crank handle in the payout direction; and a closed face housing completely enveloping the reel mechanism and including a thumb button for actuating the line brake and preparing the internal mechanism for casting.

In one type of closed face spinning reel, a line carrying spool is normally non-rotatably mounted on a hub which projects forwardly from a reel frame. The line spool is axially fixed and normally non-rotatable; however, provision is made for limited rotary slippage or "drag" of the spool relative to the reel frame for controlled withdrawal of line from the spool. During casting, the line is drawn off and over the spinner head of the spool by the momentum of the lure and travels through a line guide in a cover generally surrounding the spool.

Retrieval of paid out fishing line may be effected in reels of this type by a spinner head mounted on a rotatable main shaft carried by the reel frame and driven by a crankshaft appropriately geared therewith. Advantageously, the spinner head of such a reel includes one or more selectively, radially projectable pickup pins carried at the periphery thereof. As is customary in spinner heads having projectable pickup pins, the reel mechanism may have a cam arrangement for accommodating projection or retraction of the pickup pins with respect to the periphery of the spinner head. Typically, the reel also includes a crank assembly to effect the necessary rotation of the main shaft to retrieve paid out line. Advantageously, a selectively actuatable anti-reverse mechanism is also included in the reel to prohibit rotation of the retrieval mechanism in a line payout direction. A rearwardly disposed, thumb button-actuated line brake ring is arranged in a reel of the foregoing general description to clamp the line against the rearmost edge of the spinner head preparatory to casting and also to displace the spinner head to a position in which the aforementioned pickup pins are retracted. This arrangement provides an advantageous sequential line braking-pickup pin retracting action in which the second action (pickup pin retraction) cannot possibly be effected until the first action (line braking) has been effected. A more complete understanding of a reel embodying such mechanism may be had from the R. D. Hull U.S. Pat. No. 3,481,554, the disclosure of which is incorporated by reference herein.

The aforementioned basic closed face reel components have taken a variety of shapes, forms and structures in the constructions of the prior art. However, there are certain improvements therein in the nature of simplification and/or rearrangement of parts which, advantageously, lead to a reduction in manufacturing expense, a simplification of assembly and use of a closed face spinning reel, and an enhancement of reel reliability and response.

For a more complete understanding of the reel of the present invention and a greater appreciation of its attendant advantages derived from its specific structural features, reference should be made to the following detailed description of the new closed face reel, taken in conjunction with the accompanying drawings, which are illustrative of a preferred embodiment of the new reel of the present invention.

DESCRIPTION OF THE DRAWINGS

FIG. 4 is a side elevational view of the reel of the invention with parts broken away to show the interrelationship of the reel elements;

FIG. 5 is a cross-sectional view of the reel taken along line 5—5 of FIG. 4;

FIG. 6 is a fragmentary, perspective view with parts broken away of the internal reel mechanism showing details of construction;

FIG. 7 is a fragmentary, end elevational view of the anti-reverse mechanism of the new reel;

DETAILED DESCRIPTION OF A PREFERRED EMBODIMENT OF THE INVENTION

Figure 1:
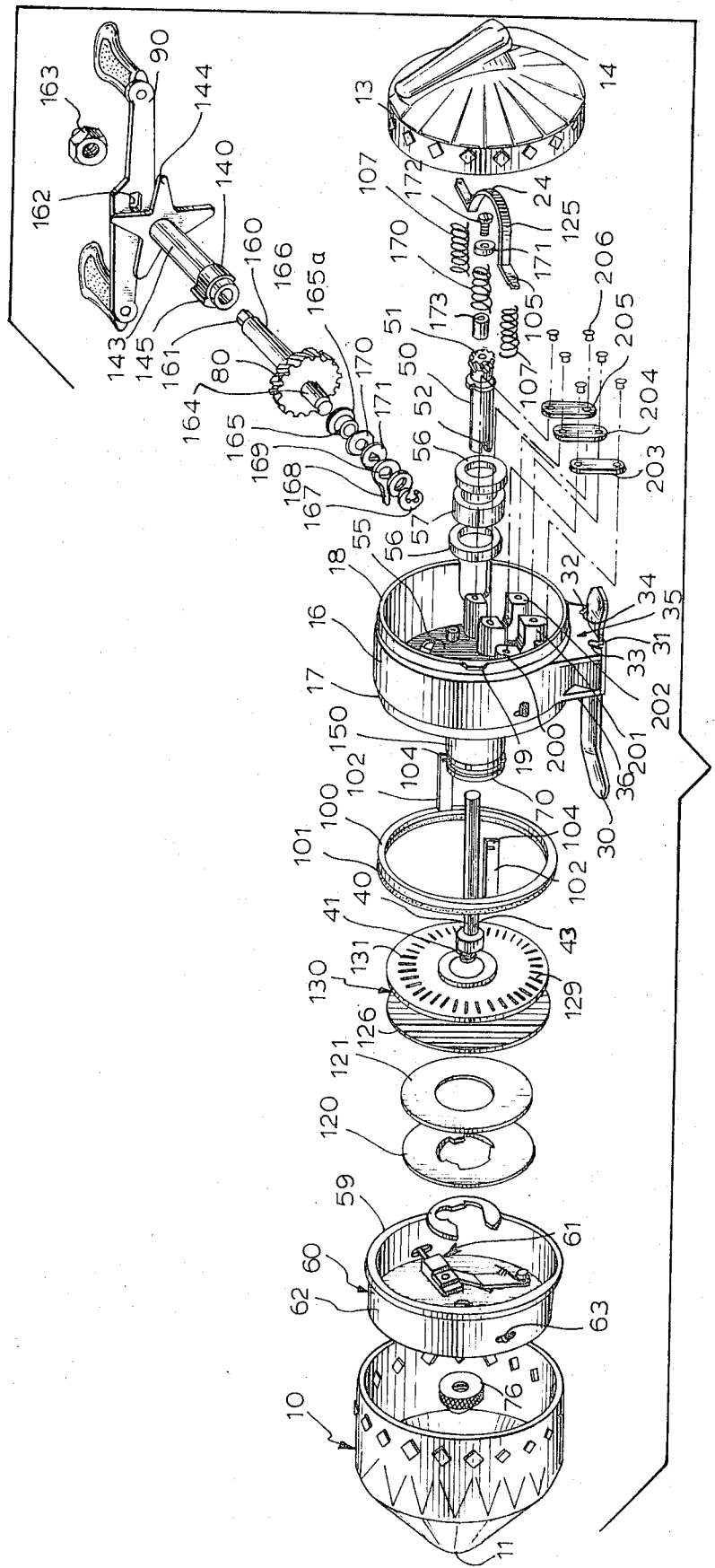
FIG. 1 is an exploded, perspective view of the components of the new and improved closed face spinning reel of the present invention showing the manner in which they are assembled.
Figure 2:
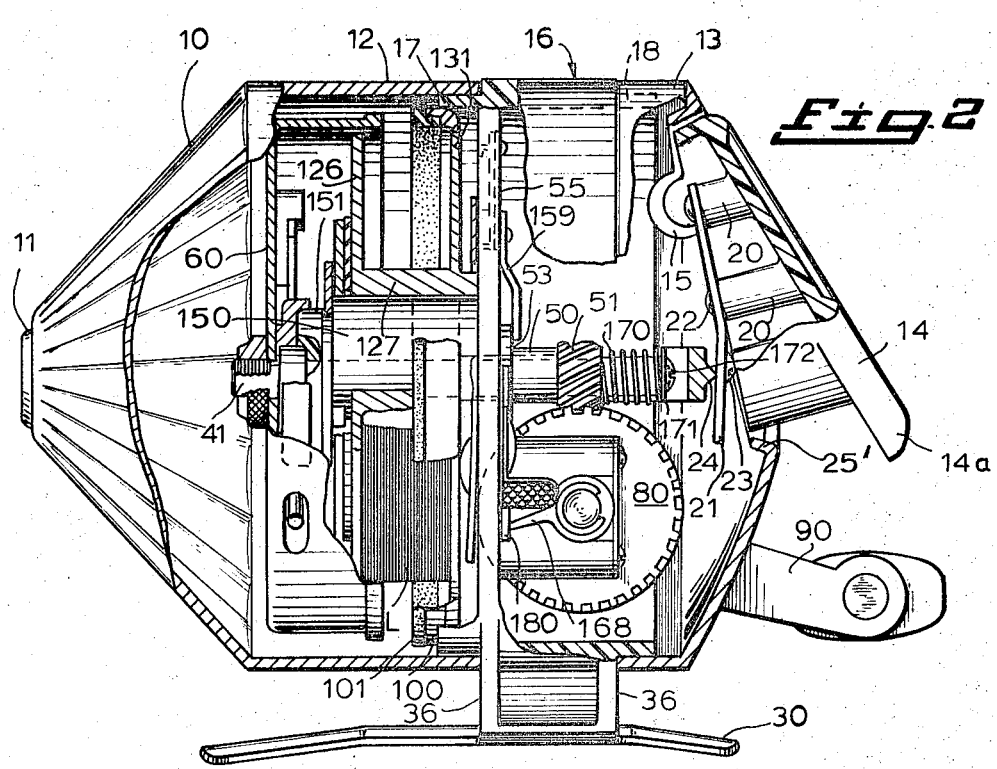
FIG. 2 is a side elevational view of the reel of the invention with parts broken away to show details of construction.
Figure 3:
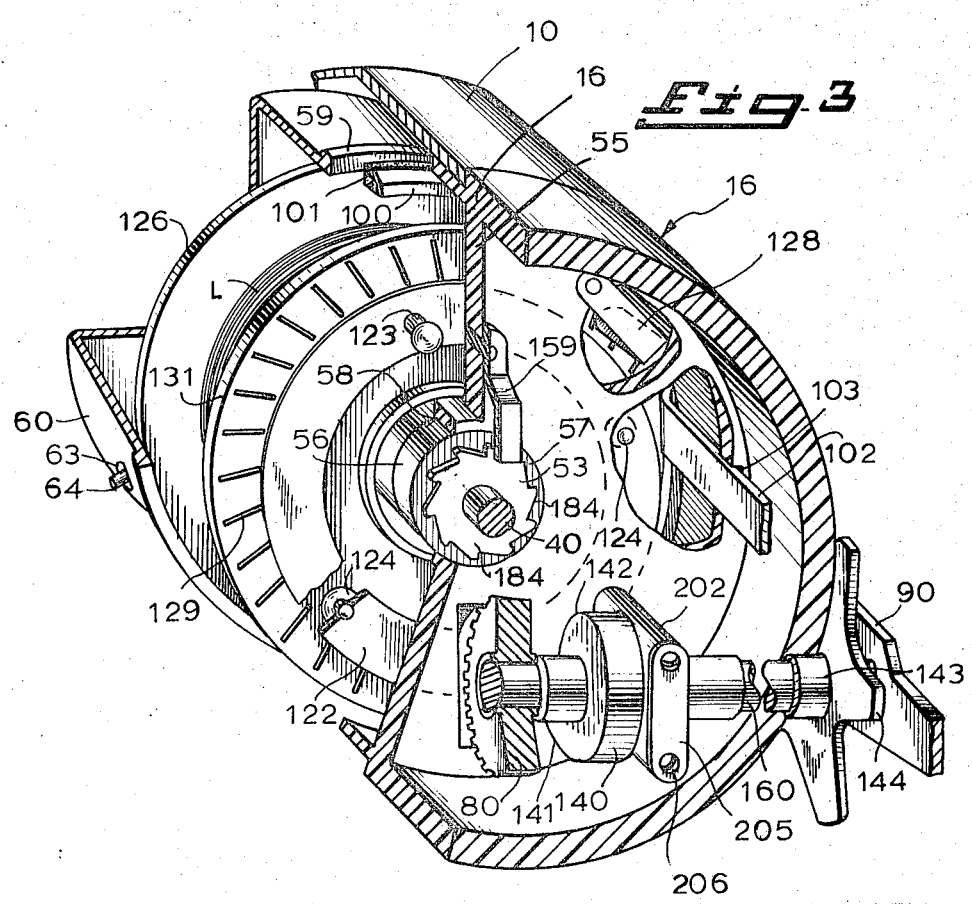
FIG. 3 is an enlarged, fragmentary, perspective view of the internal reel mechanism with parts broken away to show details of construction.

Referring now to FIGS. 1–3, the new reel includes a closed housing comprised of a front frusto-conical cover 10, a cylindrical housing body 16, and a rear cover 13. The front cover has a central line guide 11 disposed at its forwardmost portion and locking detents (not shown) disposed at its inner rearmost cylindrical edges. The rear cover 13 is generally cup-shaped and has locking detents (not shown) arrayed at its inner forwardmost edges. A pivotable thumb button 14 is journaled for limited swinging movement by integral perforated brackets 15. The front and rear covers, both of which advantageously may be manufactured from sheet metal, or from molded high impact strength plastic, are connected to the central reel body 16. As shown, the reel body has a forwardly extending annular flange 17 and a rearwardly extending annular flange 18, both of which flanges include a plurality of locking elements 19 which cooperate with the detents in the covers. Thus, the covers may be aligned, telescoped, and rotated over the flanges to lock the covers to the reel body, in accordance with the principles described in more detail and claimed in the R. D. Hull U.S. Pat. No. 3,473,753.

As shown best in FIG. 2, the thumb button 14 is of generally hollow construction and includes integral posts 20 of overtravel line from which a bent spring actuator 21 is cantilevered. The actuator 21 is secured to the posts by rivets 22 and further includes, at its distal end, an integral concavity 23 which engages a mating convex projection 24 formed on the rearwardmost end If a line brake actuator 125. This improved thumb button arrangement provides sensitive control and accommodates limited overt,avel when the thumb button 14 is depressed to actuate the ine brake during the initial stages of casting, as will be appreciated.

The thumb button 14 also includes integral pivot axles 15a which are adapted to be projected through the openings in rear cover brackets 15, in order to mount the thumb button in its operative position in the housing for pivotal movement toward and away from the reel body 16. As shown in FIG. 2, the cantilevered actuator 21 is of sufficient length that its free end extends beyond the bottom edge of the thumb button for engagement with the edge 25' at the bottom of the thumb button opening. Thus, rearward travel of the thumb button is limited by the engagement of actuator 21 with the edge 25' and forward travel of the thumb button is limited by engagement of an integral skirt 14a with the same edge 25'.

In accordance with the invention, the tang or rod mount 30 is formed from an aluminum element which is provided with a pair of converging "dovetailed" flanges 31, 32 (FIGS. 1 and 8) which are engaged in corresponding "dovetailed" slots 33, 34 formed in an extension 35 at the base of the reel body 16. The extension 35 is reinforced by webs 36, as shown, for enhanced strength and rigidity. As shown in the drawings, the tang 30 may be inserted directly into the slots 33, 34 in the reel body and subsequently permanently secured by a single rivet or comparable fastener 35' (FIG. 9) to anchor, securely and reliably, the tang to the reel.

In accordance with the invention, the reel includes a center main shaft 40, the forwardmost end 41 of which is threaded and carries a spinner head best illustrated in FIG. 5. A cylindrical, cup-shaped spinner head 60 is non-rotatably keyed to the end 41 of the main shaft 40 for rotation therewith and is fastened thereto by a lock nut 76. As shown in FIG. 5, the spinner head 60 includes a rearwardly extending annular flange 62 having diametrically opposed slots 63 formed therein and a thick bead 59 formed at the free edge thereof. The pickup elements 61 comprise pickup pins 64 carried in molded cam follower portions 65. Each of the molded portions is riveted to a support arm 66 pivotally mounted to the spinner head transverse wall 67 by a rearwardly projecting stud 68.

As shown, a closely wound torsion spring 69 is supported on the stud 68 with one free end 69a bearing against the inner surfaces of the flange 62 and its other free end 69b acting against an ear 72 formed on the support arm 66. Since there is a natural tendency of the spring ends to diverge, the spring provides a constant biasing of the arm 66 in the radially inward direction.

Figure 8:
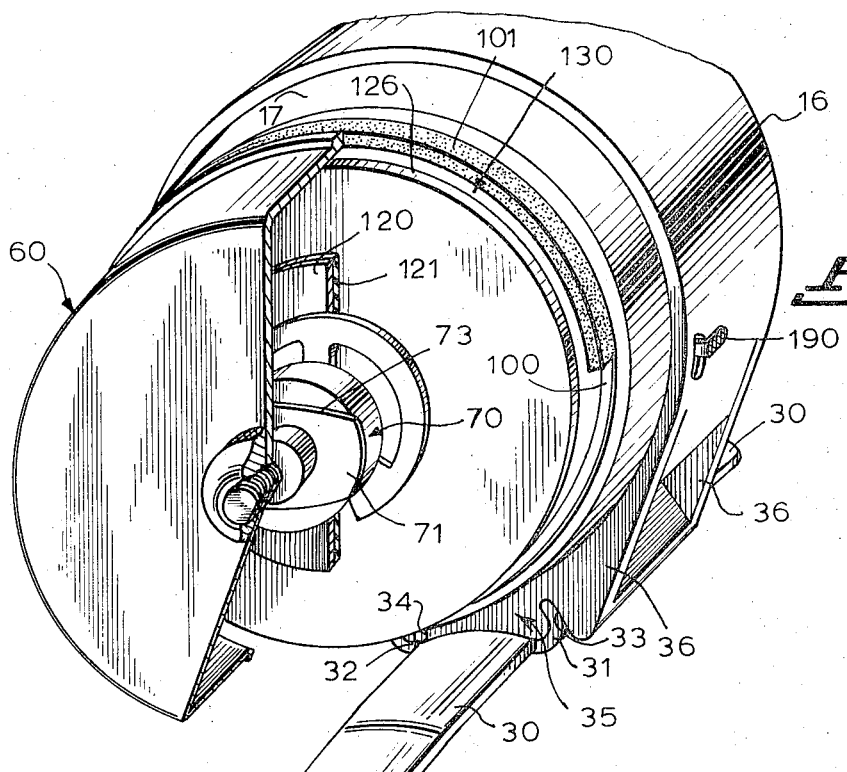
FIG. 8 is a front perspective view of the reel with parts broken away to show details of construction of the drag brake and of the dovetailed attachment of the rod mount to the reel body.

The molded cam follower portion 65 of the pickup elements are adapted to engage a hollow, coin-like cam 70 (FIG. 1) element mounted on the outer end 151 of the center hub 150 projecting forwardly from the reel body wall 55. As shown in FIGS. 5 and 8, the cam 70 has high portions 71 and intermediate portions 73. When the follower portions 65 of the pickup elements are unrestrained by the cam 70 (when the reel is disassembled), the pickup pins 64 will be withdrawn to portions within the peripheral confines of the spinner head against integral stops 75 by the spring biased arms 66. However, when the follower portion 65 engages the high cam surface 71, the pickup pins 64 will be projected through the periphery of the spinner head into an active line retrieval position, as will be understood.

In accordance with the invention, the main shaft 40 is rotated in either direction through a drive train including a pinion shaft 50 having an integral helical pinion 51 at its rearwardmost end and an elongated driving slot 52 at its forwardmost end (FIG. 1) which engages a driving pin 43 on the center shaft. Also, integrally formed on the pinion shaft is an anti-reverse ratchet wheel 53 which is disposed adjacent a vertical transverse wall 55 of the reel body 16. As indicated in FIG. 1, the main shaft 40 is telescoped within the pinion shaft 50, which, in turn, is supported in a pair of ball bearings 56 retained in a ring 57 in a central opening 58 formed in the wall 55. Axial displacement of the pinion shaft is prohibited by a bent restraining arm 159 mounted to the rear face of the wall 55, as shown best in FIG. 3. The center shaft 40 is axially displaceable within the pinion shaft for a limited distance for engagement of the pickup elements 61 with the cam 70, as will be explained in greater detail hereinafter. It will be appreciated that the driving connection between the pinion shaft 50 and the main shaft 40 is maintained by the constant cooperation of the drive pin 43 with the slot 52. The main shaft 40 is provided with a constant rearward bias by a coil spring 170 acting between a washer 171 (secured to the main shaft by a screw 172) and the rear face of the helical pinion 51. As shown, a spacer element 173 is supported on the screw 172 between the pinion 51 and the washer 171. Bi-directional rotary motion is imparted to the main shaft 40 by appropriate rotation of the helical pinion 51 through a driving helical gear 80 which is rotated by the crank 90 in conventional manner.

As shown best in FIGS. 2 and 4, a line brake ring retainer 100 carrying a brake ring 101 of rubber or a similar material having a high coefficient of friction is supported by spaced legs 102 extending through slots 103 in the reel frame. The rearmost portions of the legs 102 of the brake ring retainer have locking portions 104 formed thereon, which portions are insertable through and are retained in openings 105 formed in a brake actuating bar 125. The brake ring is given a rearward bias by a pair of compression springs 107 which are disposed inwardly of the legs 102 over integral, cylindrical pins 108 formed on the rear face of the reel frame. The springs 107 are fastened to the actuating bar 125 by rivets or the like.

The completed brake ring assembly will be urged rearwardly of the reel by the springs 107. A convex central portion 24 of the actuating bar 125 will be in contact with the concavity 23 in the cantilevered element 21 and will normally urge the thumb button 14 to its rearwardmost position, as described hereinabove.

Figure 10:
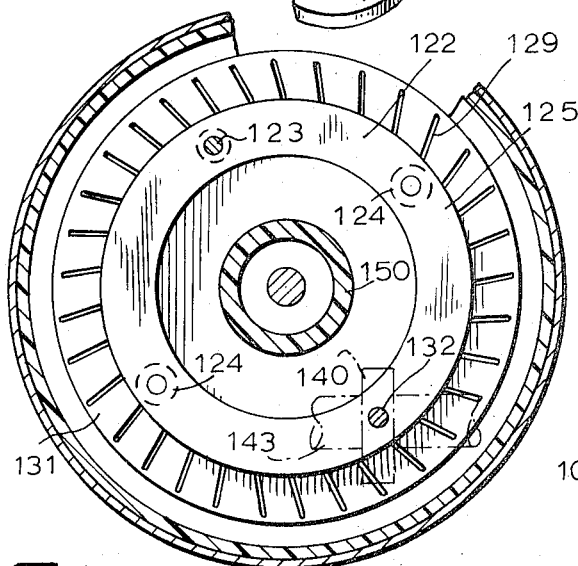
FIG. 10 is a cross-sectional view of the reel of the invention taken along line 10—10 of FIG. 9.

In accordance with another important aspect of the invention, an improved drag brake is provided in the reel, which drag brake is controllable through a star wheel mounted adjacent the crank handle 90. More specifically, and as shown in FIGS. 1, 3, and 8–10, the drag brake mechanism includes an annular spool washer element 120, an annular clutch pad 121 formed of a material having a high coefficient of friction, and an annular actuating ring 122 loosely mounted by a rivet 123 for limited annular displacement of the bottom portion thereof at the front face of the reel wall 55. As indicated in FIG. 10, the actuating ring 122 mounts a pair of plastic buttons 124 at diametrically opposed portions of its front face, which buttons 124 contact the rear wall 131 of a line spool 130. The line spool is conventional, including a front wall 126 similar to the rear wall 131 and has an arbor 127 on which fishing line L is wound. The rear surfaces of the rear wall 131 are provided with serrations 129 (FIG. 10) for cooperation with a cantilevered, bent alarm spring 128 (FIG. 3) mounted on the rear face of the reel wall 55 and having a forward tip projecting through the rear wall. As will be understood, rotation of the spool will cause an audible alarm to be sounded by the repeated contact of the serrations 129 with the alarm element 128.

Figure 9:
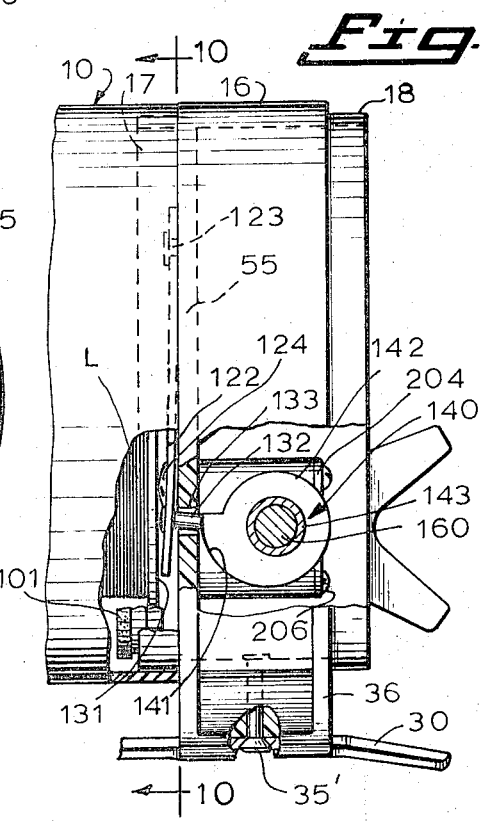
FIG. 9 is a side elevational view of the reel with parts broken away to show details of construction of the new and improved drag brake control and actuation mechanism.

In accordance with the invention, the drag brake actuator ring 122 includes a rearwardly extending pin 132 which projects rearwardly through an opening 133 in the wall 55 and into contact with an actuating cam 140 having high portions 141 gradually merging into low portions 142. As shown in FIG. 9 and as will be understood, when the high portions 141 of the cam 140 engage the end of the pin 132, the actuator ring 122 will be pivoted to a forwardmost position in which it will urge the front wall of the spool 130 tightly against the clutch pad 121, and thereby provide maximum resistance against slippage of the hub of the spool about the forwardly projecting cylindrical reel hub 150 upon which the spool 130 is normally non-rotatably supported. Of course, when the low portions 142 of the cam 140 contact the pin 132, the actuator 122 will be in its minimally forwardly displaced position and the drag braking pressure exerted on the spool 130 will be minimized. A radially extending lip 145 (FIG. 1) projects from the cam and by engagement with the sides of the pin 132 limits rotation of the cam to slightly less than one revolution. Thus, in accordance with an important aspect of the invention, the spectrum of drag (i.e., from maximum to minimum) may be effected within a single revolution of the cam 140 (and, of course, the star wheel shaft 143 to which it is attached). The star wheel drag control may be operated independently of the main shaft drive mechanism described in detail hereinafter.

More specifically, the new and improved drive mechanism of the new reel includes a crankshaft 160 (FIG. 1) which mounts the helical drive gear 80 in a plane perpendicular to that of the helical pinion 51 described hereinabove. The shaft 160 is telescoped within the star wheel shaft 143 and has a flat 161 formed at its outer end for non-rotatable keying of the shaft to the crank 90 by means of a slot 162 formed therein. The outer end of the shaft 160 is also threaded to receive locking nut 163, while the inner portions 164 of the shaft 160 are supported for rotation in a crank bearing 165. The inner end 166 of the crankshaft includes an annular groove to receive a locking C-clip 167.

In accordance with the principles of the invention, an anti-reverse actuator in the nature of a flat finger 168 formed integrally and projecting from a washer element 169, is mounted for rotation with and controlled slippage relative to the crankshaft 160, by means of clutch washers 170 and a bent clutch spring 171. Thus, when the finger 168 is unrestrained, it will tend to rotate with the crankshaft to pivot, in accordance with the principles of the invention. An anti-reverse pawl 180 (FIG. 7) is rotatably mounted to the rear surface of the reel wall 55 by a rivet 181. As shown best in FIGS. 6 and 7, the lower end of the anti-reverse pawl 180 includes an elongated camming slot 182 into which the free end of the finger 168 projects for cooperation therewith. The upper free end 183 of the pawl is in the form of a pawl tooth which is adapted to engage the ratchet teeth 184 of the ratchet wheel 53 to prevent the reverse rotation of the pinion shaft 50 and hence the main shaft 40. In accordance with the invention, when the anti-reverse pawl 180 is locked in a non-ratchet wheel engaging position (shown in phantom in FIG. 7) by a pivotable anti-reverse control lever 190, which is mounted adjacent the element 180 on the rear face of the reel wall 55 by a rivet 191, the anti-reverse finger 168 slips relative to the crankshaft 160 as it is rotated.

As another important aspect of the invention, the crankshaft and star wheel are supported in the reel housing in three integrally molded U-shaped brackets 200, 201 and 202, shown in FIGS. 1 and 7. The star wheel shaft 143 rests directly in the brackets 201, 202 and is located and retained in its proper operative position by the disposition of the cam 140 between the opposed side walls of the brackets 201, 202. The crank bearing 165 is similarly supported in the bracket 200 and is advantageously, properly positioned by the flange 165a of the bearing, which is disposed between the face of the helical drive gear 80 and the outer wall of the bracket 200. The bearing 165 and the shaft 143 are secured within the brackets 200–202 by cover plates 203–205, which are fastened to the outer faces of the brackets by screws 206 of the like.

OPERATION OF THE NEW REEL

In the operation of the new reel by a fisherman, the line L is braked against a premature release during the preliminary stages of casting by the forward displacement of the brake ring 101 against the rear edge 59 of the spinner head 60 (shown best in FIG. 4). More specifically, the depression of the thumb button 14 will cause the cavity 23 in the spring element 21 to engage the projection 24 on the brake ring actuator 125 to move it forwardly of the housing 16 to effect a secure clamping of the line between the brake ring and the spinner head. Release of the thumb pressure from the button 14 will allow the brake ring 101 to be immediately withdrawn from the spinner head under the rearward bias of the compression springs 107, which springs normally urge the thumb button into a rearwardmost position with its spring element 21 engaging the housing opening 25'. As is well known in the art of spin casting, the aforementioned line clamping is effected throughout the backswing of the casting rod and during the initial stages of the forward swing. Release of the thumb pressure will, of course, allow the line and lure to fly off the spool and out of the reel in a trajectory toward a target area.

During these phases of the casting and while the line is being drawn off the spool under the forward momentum of the cast lure, the spinner head and the main shaft will be locked in a forwardmost position by the cooperation of the cam follower portion 64 of the pickup elements 70. Retrieval of the line is effected simply and efficiently by rotating the main shaft through the pinion shaft and driving crankshaft arrangement described in detail hereinabove. As is common in reels of this type, predetermined slippage of the normally non-rotatable spool relative to the reel housing is accommodated by the new drag brake arrangement. That is to say, during line retrieval or while line is being paid out, excessive forces which may be exerted on the line by a hooked object which would otherwise tend to brake the line are compensated for by the controlled rotation or slippage of the spool about its cylindrical support on the reel. In the new reel, the drag brake is in the form of slip clutch elements cooperating with the front face of the line spool to apply selected drag braking pressure. Importantly, the degree of drag braking pressure applied to the front face of the reel is controlled through a pivotable actuator plate which is controlled by a single revolution cam operated by a star wheel adjacent the crank handle used for line retrieval.

As a further feature of the reel of the present invention, a new and improved anti-reverse pawl is included for limiting rotation of the main shaft to a single direction. The anti-reverse pawl cooperates with the ratchet integrally formed on the pinion shaft to prohibit the reverse rotation of the pivot shaft and hence the main shaft. The pawl actuator is uniquely and simply connected to the end of the crankshaft by a slip clutch arrangement, in accordance with the principles of the present invention and as described in detail hereinabove.

It should be understood that the specific closed face spinning reel structure herein illustrated and described is intended to be representative only, as certain changes may be made therein without departing from the clear teachings of the disclosure. Accordingly, reference should be made to the following appended claims in determining the full scope of the invention.

I claim:

1. In a closed face spinning reel including a cylindrical reel body divided by a transverse circular wall, a spool supported on a hub projecting forwardly of said wall, a main shaft extending axially through the center of said circular wall, a crank drive mechanism mounted in said reel body for rotating said main shaft, line pickup means carried by the forward end of said main shaft, a front cover means closing off the front face of said reel body and a rear cover means closing off the rear face of said reel body, the improvement including a. a ball bearing means mounted in a central opening defined by said circular wall,
   b. a hollow pinion shaft means supported for rotation in said ball bearing means and mounting a pinion rearwardly of said circular wall,
   c. said main shaft means being supported telescopically within said hollow pinion shaft means for rotation therewith and for limited axial movement relative thereto,
   d. means keying said main shaft to said hollow pinion shaft means to provide a driving connection therebetween in all telescoped positions of said shafts,
   e. at least two separate, integral U-shaped bearing elements extending rearwardly from said transverse wall,
   f. said crank drive mechanism including crank shaft means disposed perpendicular to said main shaft and supported for rotation within said U-shaped bearing elements,
   g. said crank drive mechanism further including a helical drive gear mounted on said crank shaft means for rotation therewith and maintained in meshing driving engagement with said pinion, said helical drive gear being disposed between said U-shaped bearing elements,
   h. retaining plate means interconnecting the legs of said U-shaped bearing means to retain said crank shaft therein,
   i. said crank shaft means projecting laterally outwardly of said cylindrical housing to accommodate the mounting thereon of a crank handle,
   j. annular washer means secured to the rear portions of said main shaft,
   k. biasing coil spring means disposed over said main shaft and acting between said annular washer means and said pinion to bias said main shaft rearwardly of said reel housing,
   l. whereby the rotation of said crank shaft means in either direction effects the clockwise and counterclockwise rotation of said main shaft through the corresponding rotation of said pinion shaft means.

2. The reel of claim 1 further characterized in that
   a. a hollow star wheel control shaft is directly supported in said U-shaped bearing means,
   b. said crank shaft is supported for rotation within said hollow star wheel shaft for rotation independently thereof, and
   c. control means mounted on said star wheel shaft for rotation therewith.

3. The reel of claim 2 further characterized in that
   a. said control means carried by said star wheel shaft is a single revolution cam having high portions gradually merging with low portions,
   b. said cam means is disposed adjacent an opening extending through said circular wall,
   c. annular drag brake actuator means disposed immediately adjacent the front face of said circular wall generally concentrically with said forwardly projecting hub,
   d. control pin means projecting rearwardly from said plate means and through said opening into contact with said cam means,
   e. whereby selective rotation of said cam means will effect the gradual axial displacement of said actuator means relative to the front face of said circular wall, thereby selectively forwardly displacing a line spool mounted on said hub, f. limit means fixed to the forward end of said hub to limit the forward displacement of a line spool thereon.

4. The reel of claim 3 further characterized in that
   a. a line spool is supported on said hub,
   b. annular brake pad means are supported on said hub between the front face of said spool and said limit means.

5. The reel of claim 4 further characterized in that
   a. said brake pad means is in the form of an annular friction pad supported by a similarly shaped washer plate,
   b. said washer plate being disposed between said brake pad and said limit means.

6. The reel of claim 5 further characterized in that
   a. said annular actuator means includes a plurality of spool-engaging buttons,
   b. fastening means loosely connecting said actuator to said transverse wall at a point opposite to said pin means.

7. In a closed face spinning reel having a cylindrical reel body divided by a transverse circular wall, a spool supported on an integral hub projecting forwardly of said wall, a main shaft extending axially through the center of said circular wall and being rotatable through a crank drive mechanism mounted in said reel body, line pickup means carried by the forward end of said main shaft, a front cover means closing off the front face of said reel body and a rear cover means mounting a pivotable thumb button means closing off the rear face of said reel body, the improvement including
   a. integral anchoring means projecting from the botton wall portions of said reel body,
   b. said anchoring means defining a pair of axially extending converging slots,
   c. elongated rod mount means having converging flange means adapted to dovetail with said slot means,
   d. fastening means securing said rod mount means to said reel body.

8. The reel of claim 7 further characterized in that said reel body includes
   a. web means strengthening and supporting said anchoring means,
   b. said web means being generally triangular in shape and extending between the forwardmost and rearwardmost portions of said anchoring means and the periphery of said cylindrical reel body.

9. The reel of claim 1, further including
   a. an actuating finger means carried by said crank shaft means,
   b. clutch means cooperating with said crank shaft means and said finger means to accommodate slippage of said finger means relative to said crank shaft means when said finger means is restrained,
   c. pawl means mounted on the rear face of said circular wall for pivotal movement towards and away from the central axis of said reel,
   d. ratchet means mounted on said pinion shaft means adjacent said pawl means for selective cooperation therewith to limit the rotation of said pinion shaft means to a predetermined single direction,
   e. actuating slot means defined by said pawl means for cooperation with said finger means whereby the rotation of said crank shaft means in a first direction urges said finger and said pawl toward the central axis of said reel thereby causing said pawl means and ratchet means to be engaged and to prohibit rotation of the pinion shaft means and the main shaft means driven thereby in a first direction,
   f. whereby rotation of said crank shaft means in a second direction opposite to said first direction causes said finger means and pawl means to be moved away from said central axis of said reel, thereby insuring the disengagement of said pawl means and ratchet means and assuring the freedom of rotation of said pinion shaft means and said associated main shaft means in a predetermined desired direction.

10. The reel of claim 9, further characterized in that
    a. a control lever means is mounted on said rear face of said reel wall adjacent said pawl means,
    b. said control lever means being selectively rotatable into and out of blocking relation with said pawl means selectively to prohibit or to accommodate the movement of said pawl means by said finger means.

* * * * *